United States Patent
Sneed et al.

(10) Patent No.: US 12,443,672 B2
(45) Date of Patent: Oct. 14, 2025

(54) SYSTEMS, APPARATUSES, METHODS, AND COMPUTER PROGRAM PRODUCTS FOR VISUAL OBJECT EXPORT

(71) Applicant: Honeywell International Inc., Charlotte, NC (US)

(72) Inventors: Timothy Sneed, Beachwood, NJ (US); Arun Ramasubrahmanyan, Burlington, NJ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/449,410

(22) Filed: Aug. 14, 2023

(65) Prior Publication Data
US 2025/0061164 A1 Feb. 20, 2025

(51) Int. Cl.
*G06F 16/957* (2019.01)
*G06F 16/958* (2019.01)

(52) U.S. Cl.
CPC ........ *G06F 16/9577* (2019.01); *G06F 16/958* (2019.01)

(58) Field of Classification Search
None
See application file for complete search history.

(56) References Cited

U.S. PATENT DOCUMENTS

| | | | |
|---|---|---|---|
| 9,495,340 B2 * | 11/2016 | Powell | H04L 67/02 |
| 9,563,929 B1 * | 2/2017 | Sokolowski | G06T 1/20 |
| 10,198,408 B1 * | 2/2019 | Commisso | G06F 40/143 |
| 10,430,458 B2 | 10/2019 | Lahmann et al. | |
| 11,593,132 B1 | 2/2023 | Rane et al. | |
| 2020/0342049 A1 * | 10/2020 | Carter | G06F 16/986 |

FOREIGN PATENT DOCUMENTS

CN 113382083 A 9/2021

OTHER PUBLICATIONS

Chinmayee Rane et al., "ChartReader: Automatic Parsing of Bar-Plots," 8 pages, (2021). [Retrieved from the Internet Nov. 7, 2023: URL: <https://www.cs.odu.edu/~jwu/downloads/pubs/rane-2021-iri/rane-2021-iri.pdf>].

Nikita Deshpande, "How to automate taking a screenshot of a webpage and saving it as pdf file using python," USEReady, 8 pages, (May 25, 2021). [Retrieved from the Internet Nov. 7, 2023: URL: <https://www.useready.com/blog/how-to-automate-taking-a-screenshot-of-a-webpage-and-saving-it-as-pdf-file-using-python/>].

* cited by examiner

*Primary Examiner* — Irete F Ehichioya
(74) *Attorney, Agent, or Firm* — ALSTON & BIRD LLP (57) ABSTRACT

Embodiments provide for visual object export. Some embodiments receive, by a server-side computing device, a message data object identifying at least one previously rendered visual object at a client-side computing device via a web application, render, at the server-side computing device utilizing a browser client, at least one new visual object corresponding to the at least one previously rendered visual object, capture an image of the at least one new visual object rendered on the server-side computing device using the browser client, and integrate the image into a data file associated with the at least one previously rendered visual object.

16 Claims, 5 Drawing Sheets

SYSTEMS, APPARATUSES, METHODS, AND COMPUTER PROGRAM PRODUCTS FOR VISUAL OBJECT EXPORT

TECHNICAL FIELD

Embodiments of the present disclosure generally relate to exporting visual objects, and specifically to exporting visual objects rendered on client-side.

BACKGROUND

Various embodiments of the present disclosure address technical challenges associated with exporting visual objects rendered on client-side. Through applied effort, ingenuity, and innovation, Applicant has solved problems associated with exporting visual objects rendered on client-side by developing solutions embodied in the present disclosure, which are described in detail below.

BRIEF SUMMARY

In one aspect, a computer-implemented method for visual object export is provided. The example computer-implemented method includes receiving, by a server-side computing device, a message data object identifying at least one previously rendered visual object at a client-side computing device via a web application; rendering, at the server-side computing device utilizing a browser client, at least one new visual object corresponding to the at least one previously rendered visual object; capturing an image of the at least one new visual object rendered on the server-side computing device using the browser client; and integrating the image into a data file associated with the at least one previously rendered visual object.

The computer-implemented method, wherein the data file includes a PDF document

The computer-implemented method, wherein the server-side computing device includes a web server.

The computer-implemented method, wherein the browser client includes a headless browser client.

The computer-implemented method, wherein the at least one previously rendered visual object includes at least one chart.

The computer-implemented method, wherein the at least one new visual object is substantially the same as the at least one previously rendered visual object based on rendering the at least one new visual object utilizing the same resources used to render the previously rendered visual object.

The computer-implemented method, wherein the message data object includes configuration data for the at least one previously rendered visual object.

The computer-implemented method, wherein capturing an image of the at least one new visual object rendered on the server-side computing device includes capturing a screenshot of the at least one new visual object.

The computer-implemented method, wherein the message data object is generated in response to a request for the data file at the client-side computing device.

The computer-implemented method, wherein the at least one previously rendered visual object comprises a portion of a report rendered at the client-side computing device via the web application.

In another aspect, an apparatus for visual object export is provided. The example apparatus includes at least one processor and at least one non-transitory memory having computer program code stored thereon that, in execution with the at least one processor, causes the apparatus to perform any one of the example computer-implemented methods described herein.

In another aspect, a computer program product for visual object export is provided. The example computer program product includes at least one non-transitory computer-readable storage medium having computer program code stored thereon that, in execution with at least one processor, configures the computer program product to perform any one of the example computer-implemented methods described herein.

BRIEF DESCRIPTION OF THE SEVERAL VIEWS OF THE DRAWINGS

Having thus described the embodiments of the disclosure in general terms, reference now will be made to the accompanying drawings, which are not necessarily drawn to scale, and wherein:

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview

In various contexts, a user may utilize a web application to implement and/or perform various tasks. For instance, enterprises (e.g., businesses or other organizations) may produce products of various types via various research, manufacturing, and/or distribution processes associated with production of these products. In many such cases, these enterprises may develop, implement, and/or utilize one or more systems (e.g., management system, process control systems, and/or the like), processes, and/or operations with respect to the research, manufacturing, and/or distribution processes for one or more purposes. For example, Annual Product Quality Review (APQR) is a quality management process that is often required in connection with production of pharmaceutical products, during which various research, manufacturing, and/or distribution processes and any products resulting from said processes, are examined in detail to determine, for example, whether any changes to the products or processes are necessary. In some contexts, findings and/or results from various processes implemented by an enterprise, such as the APQR process, are compiled and presented in a report.

Various applications and/or systems, including web applications may be utilized to implement and/or facilitate various functionalities of an enterprise's system. For example, a web-based quality management software system may be utilized to implement and/or facilitate quality management and/or control measures undertaken by enterprises with respect to the production of their products. In some contexts, the system may be capable of facilitating and/or performing various functions including, for example, generating report(s) such as APQR reports. The report may include various content, including visual objects (e.g., charts, tables, and/or the like) rendered in the web application interface. For example, a report may include multiple chapters with each chapter including one or more charts and/or other visual objects. In this regard, a web application user interface, such as an APQR web application user interface, may be configured to render multiple charts (and/or other visual objects) per chapter of a report, which gives users the ability to review the data, confirm the accuracy of the charts (and/or other visual objects), add commentary, finalize, and/or approve the charts (and/or other visual objects).

In various contexts, a user may require a data file (e.g., PDF, word file, and/or the like) of the report rendered in the web application user interface. As one example, a user may require a portable document format (PDF) of the report rendered in the web application user interface, including the visual objects (e.g., chart, tables, and/or the like) rendered in the web application user interface as part of the report. In many cases, a user may require, particularly, that the PDF include the exact same chart, tables (and/or other visual objects) rendered in the web application user interface. As a result, systems that rely on interaction of a user with the web application user interface to generate charts and/or other visual objects rendered in the web application user interface while generating a PDF in the backend is associated with various problems and challenges. For example, a user may not navigate to each chart on the web application user interface. As another example, the data associated with a chart (or other visual object) may be stale at the time that the PDF is being generated. For example, a user may have modified a chart between the time the system captures a screenshot of the chart at the frontend and the time a PDF is requested or otherwise being generated in the backend.

Embodiments of the present disclosure provide for visual object export to address at least the various problems and challenges described above with respect to exporting visual objects (e.g., charts, tables, and/or the like) rendered in a web application for integration into a PDF and/or other data file, by for example, utilizing server-side visual object rendering technique that emulates the web application chart rendering. Some embodiments may be configured to export any visual object presented on a web application via, for example, screen shot; scraping of HyperText Markup Language (HTML), cascade styling sheets (CSS), and/or scalable vector graphics (SVG), and/or the like. Embodiments of the present disclosure may stand up a web server in response to a request for a PDF of a report rendered in a web application that includes one or more visual objects. Some embodiments navigate a browser client (e.g., headless browser client) to the web server and renders at the server-side, a visual object corresponding to a visual object previously rendered at the client-side (e.g., web application), for example, using the same resources utilized to render the visual object at the client-side. Some embodiments, using the browser client captures an image (e.g., scree shot) of the visual object rendered at the server-side for integration into a PDF being generated at the server-side. Accordingly, by rendering a new visual object at the server-side corresponding to a visual object rendered at the client-side, using the same resources, embodiments of the present disclosure exports into the corresponding PDF, the same (e.g., substantially) the same visual object as the previously rendered visual object using the most recent data associated with the visual object. Thus improving the accuracy of visual export systems, such as chart export systems, and obviating the need for a user to regenerate a PDF. In this regard, embodiments of the present disclosure improve the functioning of computers and one or more technical fields, including at least visual object export technical fields.

Definitions

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

In some embodiments, the term "computer-readable storage medium" refers to a non-transitory, physical or tangible storage medium (e.g., volatile or non-volatile memory), which may be differentiated from a "computer-readable transmission medium," which refers to an electromagnetic signal.

In some embodiments, the term "visual object" refers to a visual representation of data. Examples of visual objects include a chart (e.g., bar chart, pie chart, and/or the like), a table, and/or the like. In some examples, a visual object is rendered at a client-side computing device via a web application as part of a report rendered at the client-side computing device via the web application.

In some embodiments, the term "report" refers to a data entity that describes a collection of text data and/or image data. A report, for example, may include analysis of data. In some examples, a report may include one or more visual objects. In some example, a report may include text data and/or visual representation of data (e.g., visual objects) associated with one or more products produced by an enterprise. In some examples, a report may include multiple portions. For example, a report may include multiple chapters, where one or more chapters may include one or more visual objects. In some examples, a report may be generated at a remote computing device (e.g., client-side computing device) via a web application.

In some embodiments, the term "data file" refers to a printable version of a report rendered on a web application user interface. Examples of a data file includes, a PDF, a word file, and/or the like.

In some embodiments, the term "client-side computing device" or "client computing device" refer to a combination of computer hardware and/or software that is configured to access a service made available by a server. The server is often (but not always) on another computer system, in which case the client accesses the service by way of a network. Client-side computing devices may include, without limitation, smart phones, tablet computers, laptop computers, wearables, personal computers, enterprise computers, and the like.

In some embodiments, the term "server-side computing device" or "server computing device" refer to a combination of computer hardware and/or software that is configured to provide a service to a client device. In some examples, a server-side computing device includes a web server. In some embodiments, a server-side computing device communicates with one or more client computing devices using one or more communication networks.

In some embodiments, the term "configuration data" refers to data that is used to control one or more parameters of a visual object, and/or the behavior of a visual object generated, maintained, or otherwise utilized by an application, computing device, system, and/or the like. For example, configuration data may comprise a collection of settings that influence the generation of a visual object and/or behavior of an application, a computing device, a system, and/or the like with respect to rendering a visual object. In some examples, configuration data is associated with a previously rendered visual object is leveraged to render a new visual object corresponding to the previously rendered visual object. In some examples, configuration data is used to determine databases to retrieve data and/or the relevant data to retrieve from a database.

In some embodiments, the term "web application," "application," or similar terms refer to a computer program or group of computer programs designed for use by an interaction with one or more networked or remote computing devices. In various embodiments, the web application is configured to display web application interface(s), where users may engage with the web application. In some examples, a web application may run on a server-side computing device.

In some embodiments, the term "headless browser," "headless browser client" or similar terms refer to a browser without a graphical user interface. A headless browser may be configured to provide automated control of a web page without rendering a user interface.

Example Systems and Apparatuses of the Disclosure

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
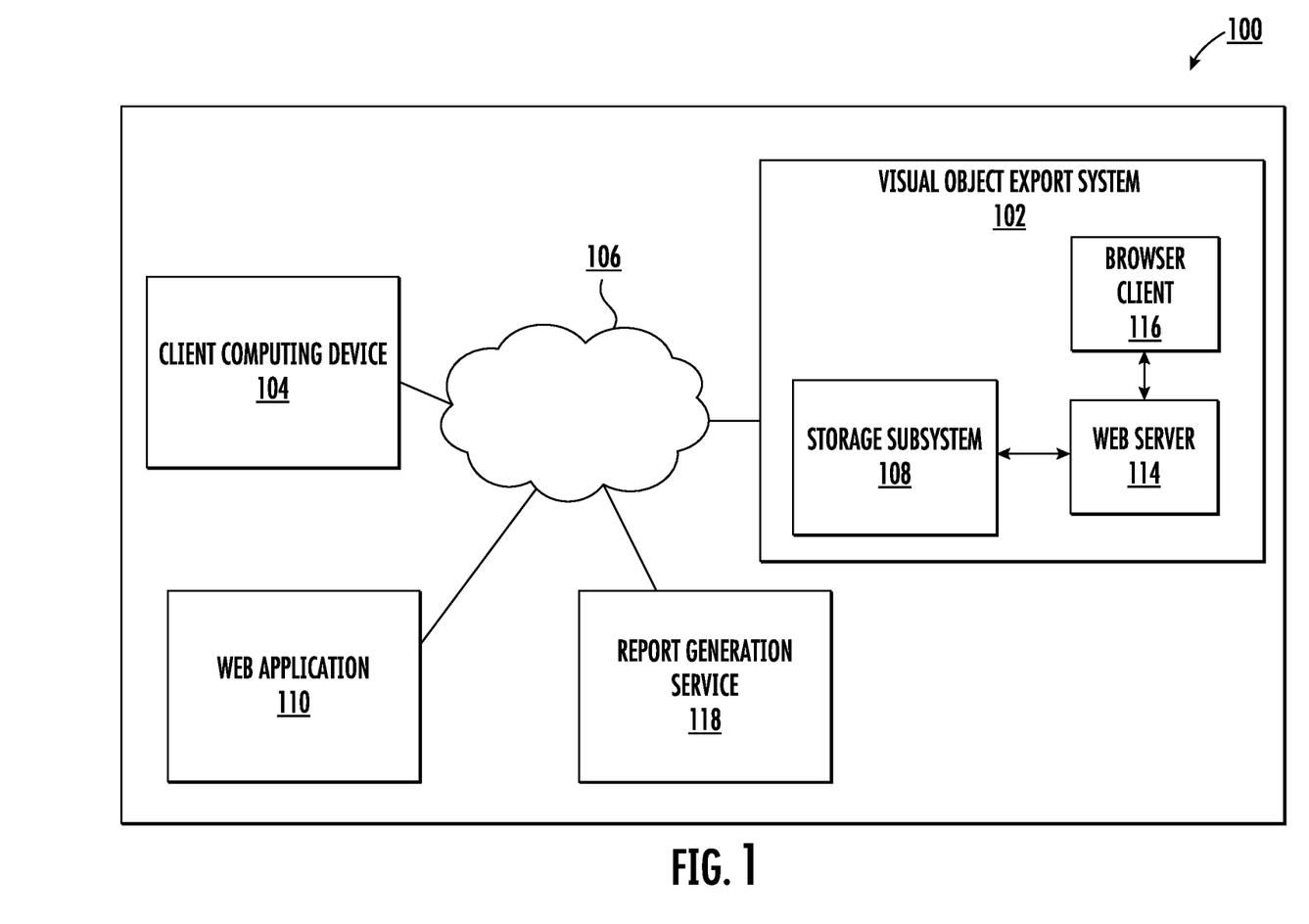
FIG. 1 illustrates a block diagram of an example environment in which embodiments of the present disclosure may operate.

FIG. 1 illustrates a block diagram of an example environment 100 within which embodiments of the present disclosure may operate. Specifically, FIG. 1 illustrates an example visual object export system 102, one or more client computing devices 104, web application 110, and a report generation service 118. One or more of the visual object export system 102, the one or more client computing devices 104, web application 110, and the report generation service 118 may communicate with each other over one or more communications network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the environment 100 may be communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities over the communications network 106 are altered and/or rendered unnecessary. For example, in some embodiments, the visual object export system 102 may include the report generation service 118. For example, in some embodiments, the client computing device 104 may include the report generation service 118.

In some embodiments, one or more of the visual object export system 102, one or more client computing devices 104 and/or report generation service 118 are embodied in an on-premises system within or associated with an entity, for example, an enterprise. In such some embodiments, one or more of the visual object export system 102, one or more client computing devices 104, and/or report generation service 118 may be communicatively coupled via at least one wired connection.

The client computing device(s) 104 may be any device suitable for performing client-side operations described herein. Client computing device(s) 104 may include, without limitation, smart phones, tablet computers, laptop computers, desktop computers, wearables, personal computers, enterprise computers, and/or any other computing device. The client computing device(s) 104 may be associated with and/or operated by users of a web application 110.

The client computing devices 104 may access and/or interact with the web application 110 including, for example, accessing, viewing, contributing, and/or editing the content of one or more web pages rendered by the web application. In order to perform these functions, the client computing device(s) 104 may include one or more clients that is configured to facilitate communication with the web application 110, render user interfaces based on instructions received from the web application and receive inputs from client computing device(s) 104 allowing interaction with the web application.

The one or more clients may include instructions and data stored in the memory (e.g. non-transient compute readable media) of the client computing device 104. These instructions may be executed by a processor of the client computing device 104 to perform various functions as described herein. By way of example, some functions performed by the client include communicating with the web application, rendering user interfaces based on instructions received from the web application, and/or receiving inputs from user(s) to interact with content made available by the web application. The client may be implemented in various ways. For example, the client may be a web browser client, which accesses the web application 110 via appropriate uniform resource locators (URL) and communicates with the web application via general world-wide web protocols. In this case, the client may be configured to request, render and display user interfaces that conform to a markup language, and may be capable of internally executing browser-executable code, or other forms of code. By way of example, the client may render user interface(s) that shows one or more pages hosted by the web application, allow users to create such pages, modify such pages, and/or the like. The client may include libraries, components, and/or functions that implement the features and functions of the web application.

In one example, the web application is utilized to implement and/or facilitate various functionalities of a management system, process control system, and/or other systems associated with an enterprise. For example, an enterprise may develop, implement, and/or utilize a quality management system to ensure product quality and/or ensure adherence to industry quality standards or regulations. For example, Annual Product Quality Review (APQR) is a quality management process that is often required in connection with production of pharmaceutical products, during which various research, manufacturing, and/or distribution processes and any products resulting from said processes, are examined in detail to determine, for example, whether any changes to the products or processes are necessary. In some contexts, findings and/or results from the APQR process are compiled and presented in a report using a web application as described herein.

The report may include various content including visual objects, such as charts (e.g., bar charts, line charts, donut charts, pie charts, and/or the like), tables, and/or the like. For example, in some embodiments, the web application may be utilized to render visual objects as part of a report generated via the web application. In this regard, a web application 110 and a client, for example, browser client, may be utilized to create, view, modify, and/or interact with one or more visual objects in a report generated via the web application. In some examples, a report may include multiple chapters, with one or more of the chapters including one or more visual objects. The web application may generate the report including the visual object based on various sources of data accessible to the web application and/or interactions with and/or input from various users associated with different chapters of the report. The web application 110 may present the report including the visual objects via a user interface rendered by the web application on the client computer device 104.

In some examples, the web application may leverage one or more libraries, one or more services, one or more applications, and/or like to generate the visual objects, user interfaces, and/or the like. The one or more libraries, services, and/or applications may include components configured for rendering the visual objects, the user interfaces for displaying the visual objects, and/or the like. For example, in some examples, the web application may utilize one or more chart components to render visual objects in the web application user interface. In some embodiments, the components (e.g., chart components, user interface components, and/or the like) may include reusable components. In some examples, a reusable component describes reusable bits of code.

The visual object export system 102 may be configured to facilitate server-side rendering of previously rendered content on the client-side. For example, the visual object export system 102 may leverage various components, computing devices, systems, and/or the like to render previously rendered visual objects on the client-side (e.g., client computing device 104) on the server-side.

In some embodiments, the visual object export system 102 includes a web server 114, a browser client 116, and a storage subsystem 108. The web server 114 may be configured to run on a server-side computing device. The web server 114 may be configured to receive message data objects identifying at least one previously rendered visual object at a client computing device 104 via the web application 110, render, utilizing the browser client 116, one or more visual objects corresponding to the message data objects, and capture, utilizing the browser client 116, an image (e.g., screenshot) of the one or more visual objects, and provide the one or more charts to for example, the report generation service 118, for integration into a data file such as a PDF for example.

The storage subsystem 108 may be configured to store data used by the visual object export system 102 to perform various functions associated with the visual object export system 102. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In some examples, the storage subsystem 108 may be configured to store client codes, assets, and/or the like. In such some example, the client codes, assets, and/or the like may include one or more serverless functions, reusable component(s) (e.g., chart components, user interface components, and/or the like), and/or the like.

The browser client 116 may include one or more computer programs and/or applications executed on a computing device. The browser client 116 may be implemented in various ways. For example, the browser client 116 may be a headless browser client configured to communicate with the web server 114 to render visual objects based on instructions received from the web server 114, and capture images (screenshots) of the visual objects. A headless browser is a browser without a graphical user interface. A headless browser may be configured to provide automated control of a web page without rendering a user interface.

In some embodiments, the visual object export system 102 may embody or otherwise be implemented as a serverless architecture that can execute a serverless function inside a headless browser client executed on the web server 114. The headless browser client, for example, may be configured to execute a serverless function configured for rendering visual objects (e.g., corresponding to previously rendered visual objects in a web application user interface rendered on a client computing device 104) in memory and capturing an image of the rendered visual objects. In some embodiments, execution of the serverless function may be prompted by a message, signal, occurrence of certain event(s), and/or the like. For example, the visual object export system 102 may receive a message, signal, indication of the occurrence of a certain event, and/or the like, and cause execution of the serverless function. It should be understood that the visual object may embody or otherwise be implemented in other environments. For example, in some embodiments, the visual object export system may not be implemented as a serverless architecture.

The web server 114 and the browser client 116 may communicate with each other over one or more communications network(s). In some embodiments, the web server 114 may communicate with the storage subsystem 108 to retrieve assets and/or client codes for executing the serverless function to render and capture images of one or more visual objects corresponding to previously rendered visual objects in a web application user interface rendered on the client computing device 104. For example, the web server 114 may communicate with the storage subsystem 108 to receive chart components utilized to render charts in memory utilizing the web server 114 and headless browser client (e.g., browser client 116).

In some embodiments, the web server 114 is configured to host one or more pages for rendering the visual objects. For example, browser client 116 may be caused to navigate to a page hosted by the web server 114 to render a new visual object that corresponds to a previously rendered visual object in a web application user interface rendered on the client computing device 104. By way of example, the report generation service may include an express server.

While a single server architecture has been described herein, it will be appreciated that the system 102 can be implemented using alternative architectures. For example, in certain cases, a clustered architecture may be used where multiple server computing instance (or nodes) are instantiated. Conversely, in some cases, the visual object export system 102 may be a stand-alone implementation (e.g., a single computer directly accessed and/or used by the end user).

Example Apparatus

Figure 2:
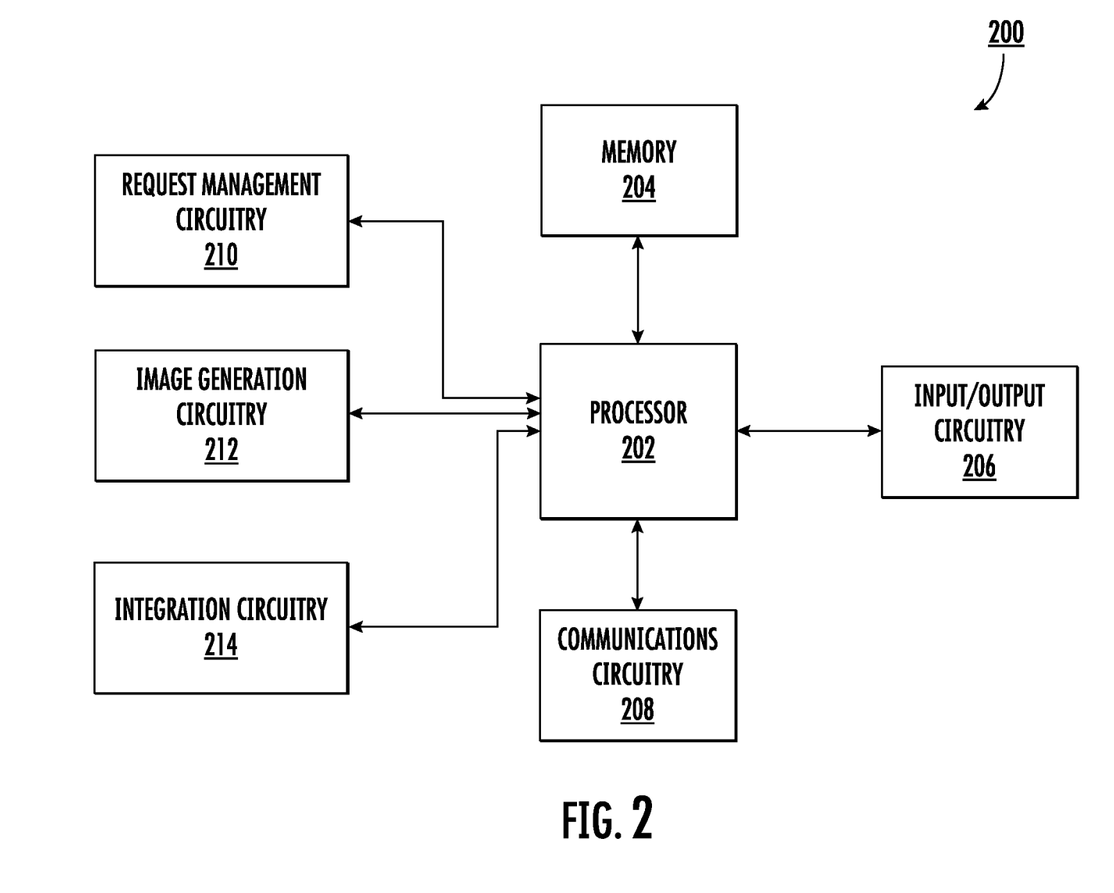
FIG. 2 illustrates a block diagram of an example apparatus in accordance with at least one example embodiment of the present disclosure.

FIG. 2 illustrates a block diagram of an example apparatus that may be specially configured in accordance with at least one example embodiment of the present disclosure. Specifically, FIG. 2 depicts an example visual object export apparatus ("apparatus 200") specially configured in accordance with at least one example embodiment of the present disclosure. In some embodiments, the visual object export system 102 and/or a portion thereof is embodied by one or more system(s), such as the apparatus 200 as depicted and described in FIG. 2. The apparatus 200 includes processor 202, memory 204, input/output circuitry 206, communications circuitry 208, request management circuitry 210, image generation circuitry 212, and/or integration circuitry 214. In some embodiments, the apparatus 200 is configured, using one or more of the sets of circuitry embodied by processor 202, memory 204, input/output circuitry 206, communications circuitry 208, request management circuitry 210, image generation circuitry 212, and/or integration circuitry 214, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular specially-configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with exporting visual objects rendered in a web application for integration into data file(s), including for example, rendering a new visual object that is the same (e.g., substantially the same) as a previously rendered visual object in a web application.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes a request management circuitry 210. The request management circuitry 210 may include hardware, software, firmware, and/or a combination thereof, configured for requesting, receiving, processing, generating, and/or transmitting data, data structures, control signals, and electronic information associated with visual object export requests. In some embodiments, the apparatus 200 may include hardware, software, firmware, and/or a combination thereof, configured for obtaining, based on a message data objects in a message queue, configuration data for previously rendered visual object(s) to facilitate server-side rendering of previously rendered visual objects at the client-side. In some embodiments, the apparatus 200 may include hardware, software, firmware, and/or a combination thereof, configured for rendering server-side visual objects corresponding to previously rendered visual objects at the client-side. In some embodiments, the request management circuitry 210 includes a separate processor, specially configured field programmable gate array (FPGA), or a specially programmed application specific integrated circuit (ASIC).

In some embodiments, the apparatus 200 includes an image generation circuitry 212. The image generation circuitry 212 may include hardware, software, firmware, and/or a combination thereof, configured for requesting, receiving, processing, generating, and transmitting data, data structures, control signals, and electronic information associated with capturing images of visual objects, for example, server-side rendered visual objects. In some embodiments, the apparatus 200 may include hardware, software, firmware, and/or a combination thereof, configured for capturing screenshot(s) of server-side rendered visual objects. In some embodiments, the image generation circuitry 212 includes a separate processor, specially configured field programmable gate array (FPGA), or a specially programmed application specific integrated circuit (ASIC).

In some embodiments, the apparatus 200 includes an integration circuitry 214. The integration circuitry 214 may include hardware, software, firmware, and/or a combination thereof, configured for requesting, receiving, processing, generating, and transmitting data, data structures, control signals, and electronic information associated with the integration images (e.g., screenshots) of visual objects, for example, server-side rendered visual objects into corresponding PDF and/or other data file. In some embodiments, the integration circuitry 214 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, request management circuitry 210, image generation circuitry 212, and/or integration circuitry 214 are combinable. Alternatively or additionally, in some embodiments, one or more of the sets of circuitry perform some or all of the functionality described associated with another component. For example, in some embodiments, two or more of the sets of circuitry embodied by processor 202, memory 204, input/output circuitry 206, communications circuitry 208, request management circuitry 210, image generation circuitry 212, and/or integration circuitry 214 are combined into a single module embodied in hardware, software, firmware, and/or a combination thereof. Similarly, in some embodiments, one or more of the sets of circuitry, for example request management circuitry 210, image generation circuitry 212, and/or integration circuitry 214 is/are combined with the processor 202, such that the processor 202 performs one or more of the operations described above with respect to each of these sets of circuitry embodied by the request management circuitry 210, image generation circuitry 212, and/or integration circuitry 214.

Exemplary Client Computing Device

Figure 3:
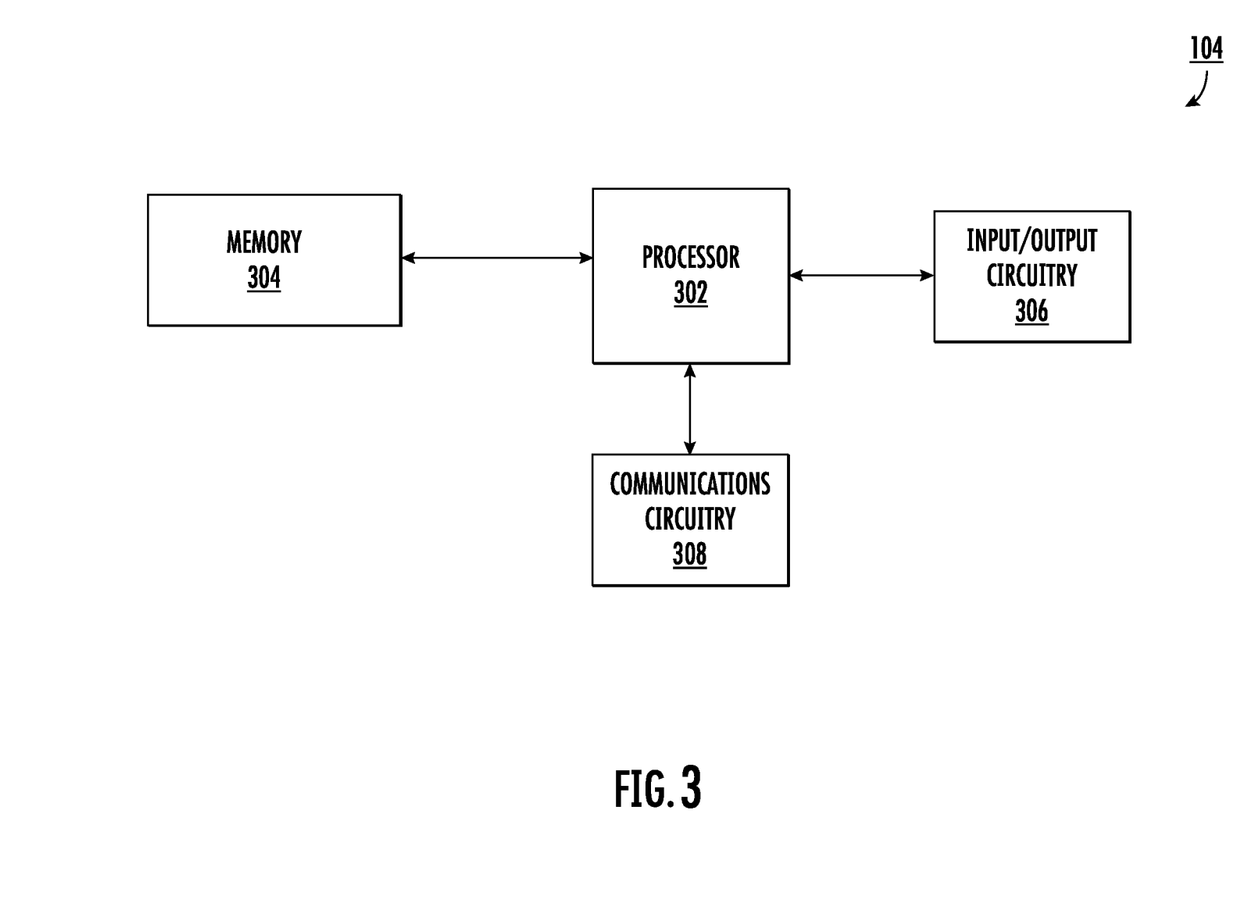
FIG. 3 illustrates a block diagram of an example client computing device in accordance with at least one example embodiment of the present disclosure.

FIG. 3 is an exemplary schematic diagram of a client computing device (e.g., a client computing device that is a limited interaction device or a client computing device that is a non-limited interaction device) that may be embodied by one or more computing systems, such as apparatus 300 shown in FIG. 3. The apparatus 300 may include processor 302, memory 304, input/output circuitry 306, and communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Environments and Architectures of the Disclosure

Having described example systems and apparatuses of the disclosure, example data architectures, data environments, and data flows will now be described. In some embodiments, the data architectures represent data object(s) maintained and processed in particular computing environments. In some embodiments, the computing environment(s) is/are maintained via hardware, software, firmware, and/or a combination thereof, that execute one or more software application(s) that manage such data. For example, in some embodiments, the apparatus 200 executes one or more software application(s) that maintain the data architecture(s) as depicted and described to, alone or in conjunction with one another, perform the functionality as depicted and described with respect to adapting speech recognition confidence scores to a user(s).

Figure 4:
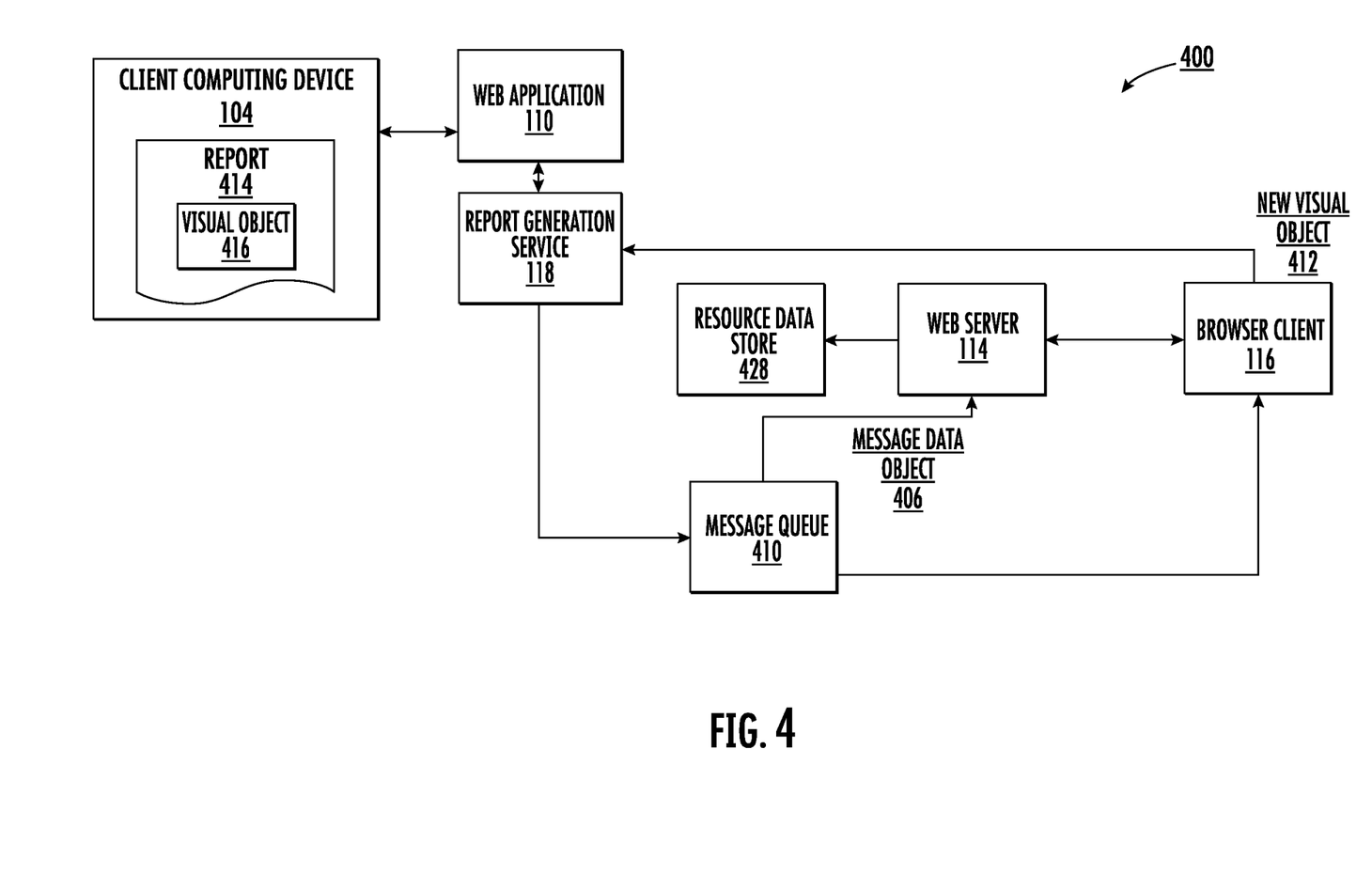
FIG. 4 illustrates an example data flow diagram for visual object export in accordance with at least one example embodiment of the present disclosure.

FIG. 4 illustrates a visualization of an example data environment for automated visual object export in accordance with at least one embodiment of the present disclosure. Specifically, the data environment for the visual object export is performed by a visual object export system 102. In some embodiments, the visual object export system 102 is embodied by the apparatus 200 as depicted and described herein. In some embodiments, the visual object export system 102 causes rendering of, or otherwise provides access to one or more interfaces specially configured to enable inputting data.

As illustrated, a web server 114 running on a server-side computing device of the visual receives a message data object 406 from a message queue 410. For example, the visual object export system 102 may be configured to consume one or more message data object(s) from the message queue 410. In some embodiments, a message data object includes configuration data for at least one previously rendered visual object at a client-side computing device. Alternatively or additionally, in some embodiments, the message data object may include a uniform resource identifier (URI) associated with the previously rendered visual object, to call over a network to get the data at run-time, including for example, configuration data and/or other data. An example of a previously rendered visual object on a client-side computing device is a chart and/or other visual objects rendered at a client computing device 104 via a web application 110.

In some embodiments, the message data object 406 is added to the message queue 410 in response to a data file request originating from a client computing device 104. The data file request, for example, may be a request for a PDF of a report rendered at the client computing device 104 via a web application, where the report includes at least one or more charts and/or other visual objects.

In some embodiments, the message data object 406 is generated by a report generation service (e.g. report generation service 118) associated with the web application 110. For example, the report generation service 118 may be configured to generate one or more messages data objects in response to receiving a data file request (e.g., from the client computing device 104) for a report that includes at least one visual object. In some examples, the report generation service 118 may utilizes a message service to implement the message queue 410.

In some embodiments, the message data object 406 includes configuration data for a previously rendered visual object 416 at the client computing device 104 via the web application 110. The previously rendered visual object 416, for example, may be a chart (or other visual object) included in the report 414 rendered at the client computing device 104 via the web application 110. For example, a message data object may be generated for each chart and/or other visual object included in the report 414 rendered at the client computing device 104.

The message data object 406 may include configuration data for the previously rendered visual object 416 at the client computing device 104. In some embodiments, receiving the message data object 406 comprises reading the message data object 406 to determine and/or extract the configuration data for the previously rendered visual object 416. In this regard, receiving a message data object from the message queue may be configured to define the visual object to be rendered on a page hosted by the web server 114 (e.g., next response by the web server 114). The configuration data for the previously rendered visual object 416 may include information that describes the visual object type of the previously rendered visual object 416, the data used to render the previously rendered visual object 416, the title of the previously rendered visual object 416, and/or the like. In this regard, configuration data from a message data object may include information that describes visual object type to render, the data to use to render the visual object, the title of the visual object, and/or the like. In some examples, the configuration data may include information that describes a location to store a new visual object 412 (e.g., server-side rendered visual object) corresponding to the previously rendered visual object 416. In some examples, the configuration data may include information that describes x/y axis, data series, titles, and/or the like corresponding to the previously rendered visual object 416. Alternatively or additionally, in some embodiments, the message data object may include a uniform resource identifier (URI) associated with the previously rendered visual object, to call over a network to get the data at run-time, including for example, configuration data and/or other data.

In some embodiments, the web server 114 renders in memory a new visual object 412 (e.g., server-side rendered visual object) in response to navigating a browser client 116 (e.g., headless browser client) to the page hosted by the web server 114. For example, the web server 114 may render the same (e.g., substantially the same) visual object in memory as the previously rendered visual object. In some embodiments, to render the same (e.g., substantially the same) visual object as the previously rendered visual object, the web server 114 leverages the configuration data, as well as the same resources utilized in rendering the previously rendered visual object at the client computing device (e.g., via the web application). For example, the same visual object components and/or other assets utilized in rendering the previously rendered visual object at the client computing device 104 may be utilized in rendering the new visual object 412 corresponding to the previously rendered visual object. For example, the web server 114 may leverage the same visual object components used in rendering the previously rendered visual object on the client-side to render the visual object 412 in memory. In some embodiments, the web server accesses the resources from a resource data store 428.

In some embodiments, the browser client 116 captures an image of the visual object 412. For example, the browser client 116 may be configured to take a screenshot of a visual object rendered in memory after navigating to the page hosted by the web server 114. In some embodiments, the browser client stores the captured image in a location obtained from the configuration data from the message data object 406.

In some embodiments, the new visual object 412 is integrated into a PDF or other data file. For example, the PDF may be generated in the server-side. In some examples, the report generation service 118 may be leveraged generate the PDF and/or integrate the new visual object 412 in the PDF (or other data file).

Example Data Flows of the Disclosure

Having described example apparatuses, systems, data flows, and environments in accordance with the disclosure, processes for exporting a visual object rendered in a web application for integration into a data file will now be described. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 5:
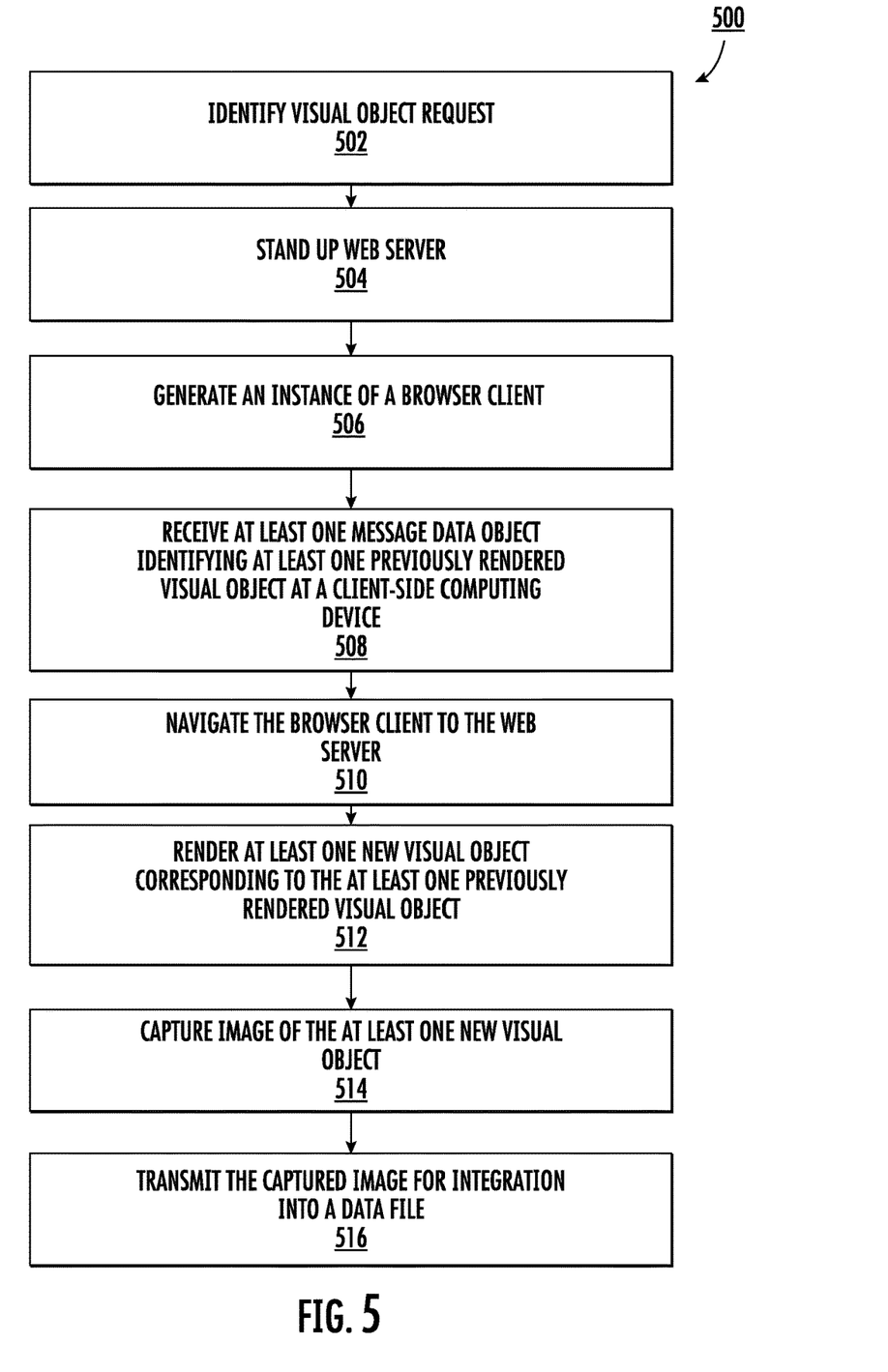
FIG. 5 illustrates a flowchart depicting operations of an example process for visual object export in accordance with at least one example embodiment of the present disclosure.

FIG. 5 is a flowchart depiction operations of an example process 500 for exporting a visual object rendered in a web application to a data file in accordance with at least one example embodiment of the present disclosure. Specifically, FIG. 5 depicts an example process 500. In some embodiments, the process 500 is embodied by computer program code stored on a non-transitory computer-readable storage medium of a computer program product configured for execution to perform the process as depicted and described. Alternatively or additionally, in some embodiments, the process 500 is performed by one or more specially configured computing devices, such as the apparatus 200 alone or in communication with one or more other component(s), device(s), system(s), and/or the like. In this regard, in such some embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one external data repository, client system, and/or the like, to perform one or more of the operation(s) as depicted and described. For purposes of simplifying the description, the process 500 is described as performed by and from the perspective of the apparatus 200.

According to some examples, the method includes identifying a visual object export request at operation 502. In some embodiments, the apparatus 200 may identify a visual object export request based at least in part on the state of a message queue. For example, the apparatus 200 may identify a visual object export request in response to determining that the message queue includes at least one message data object. A message data object may include configuration data associated with a previously rendered visual object at a client computing device via a web application. The configuration data, for example, may include information that describes a visual object type to render, the data to use to render the visual object, the title of the visual object, location to store a server-side rendering of the visual object, and/or the like. In some examples, the visual object includes a chart. In such some examples, the configuration data may include information that describes the chart type to render, the data to use to render the chart, the title of the chart, location to store a server-side rendering of the chart, and/or the like.

In some examples, message data objects are added to the message queue in response to a request for a data file of the report rendered at the client computing device via the web application. For example, one or more message data objects may be generated in response to a request for a PDF of a report rendered at a client computing device via the web application, where the report includes one or more visual objects (e.g., charts, tables, and/or the like). In some embodiments, a report generation service is leveraged to facilitate generation of the one or more message data objects. For example, the report generation service may be configured to generate a data file in response to a data file request requests originating from the client computing device. Alternatively or additionally, the report generation service may be configured to identify visual objects present in the report and generate one or more data objects corresponding to identified visual objects in the report. For example, the report generation service may be configured to traverse the report (e.g., chapter(s) of the report), to identify one or more visual objects in the report and generate one or more message data objects that include configuration data for the one or more visual objects.

In some examples, the report generation service may generate a message data object for each visual object identified. In some examples, the report generation service may generate a message data object for subsets of identified visual objects. For example, in some examples, a message data object may include configuration data for multiple visual objects. In some embodiments, the report generation service adds the one or more message data objects to the message data queue.

In some examples, a data file request may be generated in response to certain user interaction on a user interface running on the client computing device. In some examples, the data file request is a request for a PDF of the report rendered at the client computing device via the web application.

According to some examples, the method includes standing up a web server at operation 504. For example, the apparatus 200 may stand up (e.g., spin up) a web server on a server-side computing device in response to identifying a visual object export request as described herein. In some embodiments, standing up the web server includes establishing a page hosted by the web server.

According to some examples, the method includes generating an instance of a browser client at operation 506. In some embodiments, the browser client is a headless browser client. For example, the apparatus 200 may initialize an instance of an automated headless browser client.

According to some examples, the method includes processing, at the web server, a message data object defining at least one previously rendered visual object at operation 508. The message data object, for example, may include configuration data for a visual object that was previously rendered at the client-side computing device (e.g., client computing device). In some embodiments, processing the message data object includes reading the message data object to determine the configuration data to utilize in rendering a new visual object corresponding to a previously rendered visual object. For example, the apparatus 200 may be configured to iterate over the message data objects in the message queue and read information from the next message data object in the message queue to determine the configuration data to utilize in rendering the new visual object corresponding to the previously rendered visual object. For example, the apparatus 200 may be configured to reload the web server for each message data object in the message queue. The apparatus 200, for example, may define the configuration for a new visual object based on the configuration data for a previously rendered visual object at a client-side computing device.

According to some examples, the method includes navigating the browser client to the web server at operation 510. For example, the apparatus 200 may navigate the browser client to a page hosted by the web server.

According to some examples, the method includes rendering at least one new visual object corresponding to the at least one previously rendered visual object at operation 512. The apparatus 200, for example, may leverage the web server and the browser client to render the new visual object (e.g., server-side visual object). For example, the web server may be configured to render a visual object (e.g., new visual object) based on the current configuration information in response to a browser client request (e.g., navigating the browser client to the web server). For example, when navigated to the web server, the browser client may be served with a new visual object, based on the current configuration information (e.g., obtained from the configuration information in the current message data object), where the new visual object corresponds to a previously rendered visual object at the client-side computing device. In some embodiments, the web server is configured to generate a new visual object corresponding to a previously rendered visual object utilizing the same (e.g., substantially the same) resources (e.g., assets, components, and/or the like) utilized in generating the previously rendered visual object at the client computing device via the web application. The resources, for example, may include reusable component(s) (e.g., chart components and/or other reusable components) utilized to render, via the web application, the previously rendered visual object at the client-side computing device. For example, the apparatus 200 utilizing the web server and the browser client may render the at least one new visual object based on the configuration data and corresponding components (e.g., chart components, and/or the like) and/or other resources utilized to render, via the web application, the at least one new visual object at the client-side computing device.

In this regard, by generating the new visual object utilizing the configuration data associated with the at least one previously rendered visual object and the same (e.g., substantially the same) resources utilized to generate the at least one previously rendered visual object, the apparatus 200 may render at least one new visual object that is the same (e.g., substantially the same) as the at least one previously rendered visual object. By way of example, the apparatus 200, utilizing the web server and the web client may render the same chart components as those rendered, via the web application, at the client-side computing device. The apparatus 200 may obtain the relevant visual object components and/or other assets from a resource repository, for example, based on the configuration data for the at least one previously rendered visual object. In some embodiments, the apparatus 200 renders the new visual object using the most recent data for the visual object. For example, the apparatus 200 may receive from a database storing the data for the report (e . . . , enterprise database) the data to utilize in rendering the new chart based on the information from the configuration data (e.g., database location, what data to pull, and/or the like).

In some embodiments, the apparatus 200 is configured to render the server-side visual object in memory. For example, in some embodiments, the browser client may be a headless browser client. In such some embodiments, the apparatus 200, utilizing the web browser and the headless browser client, may render, in memory, at least one new visual object that is the same (e.g., substantially the same) as the at least one previously rendered visual object.

According to some examples, the method includes capturing an image of the new visual object (e.g., server-side rendered visual object) at operation 514. For example, the apparatus 200, utilizing the browser client, for example, a headless browser client, may capture a screenshot of the at least one new visual object. The at least one new visual object, for example, may be rendered in the memory utilizing the headless browser client.

According to some examples, the method includes transmitting the at least one new visual object for integration into a data file at operation 516. For example, the apparatus 200 may transmit the at least one new visual object to one or more computing devices, services, systems, and/or the like configured to generate a data file for the report, for example, at the server-side (e.g., back end). In some examples, the report generation service may be leveraged to facilitate integration of the at least one new visual object in the data file. For example, the report generation service may be configured to generate the data file at the server-side. For example, the report generation service may be configured to simultaneously generate a data file corresponding to the data file request and the message data object(s) identifying the at least one previously rendered visual object. In some embodiments, the report generation service receives the captured image (e.g., screenshot) of the at least one new visual object for integration into the data file being generated (e.g., renditioned). For example, the report generation service may apply the captured image of the at least one new visual object to the data file to integrate the at least one new visual object corresponding to the at least one previously rendered visual object in the data file. In some examples, the at least one previously rendered visual object may include at least one chart. In some example, the data file may include a PDF.

In some example, the apparatus 200 leverages a serverless framework. For example, the execution of a serverless function may cause execution of one or more of the operations described above.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, web application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for visual object export comprising:
    receiving, by a server-side computing device, a message data object identifying at least one previously rendered visual object at a client-side computing device via a web application, wherein the message data object comprises at least configuration data that is used to control one or more parameters of the at least one previously rendered visual object, wherein the configuration data comprises of at least one of a visual object type, positional attributes, rendering styles, and data source identifiers of the at least one previously rendered visual object;
    rendering, at the server-side computing device utilizing a browser client, at least one new visual object corresponding to the at least one previously rendered visual object, based on the configuration data of the at least one previously rendered visual object, wherein the at least one new visual object is same as the at least one previously rendered visual object based on rendering the at least one new visual object utilizing same resources used to render the at least one previously rendered visual object;
    capturing an image of the at least one new visual object rendered on the server-side computing device using the browser client; and
    integrating the image into a data file associated with the at least one previously rendered visual object.

2. The computer-implemented method of claim 1, wherein the data file comprises a PDF document, wherein the data file is generated at the server-side computing device.

3. The computer-implemented method of claim 1, wherein the server-side computing device comprises a web server.

4. The computer-implemented method of claim 1, wherein the browser client comprises a headless browser client.

5. The computer-implemented method of claim 1, wherein the at least one previously rendered visual object comprises at least one chart.

6. The computer-implemented method of claim 1, wherein capturing an image of the at least one new visual object rendered on the server-side computing device comprises capturing a screenshot of the at least one new visual object.

7. The computer-implemented method of claim 1, wherein the message data object is generated in response to a request for the data file at the client-side computing device.

8. The computer-implemented method of claim 1, wherein the at least one previously rendered visual object comprises a portion of a report rendered at the client-side computing device via the web application.

9. An apparatus for visual object export, the apparatus comprising at least one processor and at least one memory storing instructions that, when executed by the at least one processor, cause the apparatus to:
   receive, by a server-side computing device, a message data object identifying at least one previously rendered visual object at a client-side computing device via a web application, wherein the message data object comprises at least configuration data that is used to control one or more parameters of the at least one previously rendered visual object, wherein the configuration data comprises of at least one of a visual object type, positional attributes, rendering styles, and data source identifiers of the at least one previously rendered visual object;
   render, at the server-side computing device utilizing a browser client, at least one new visual object corresponding to the at least one previously rendered visual object, based on the configuration data of the at least one previously rendered visual object, wherein the at least one new visual object is same as the at least one previously rendered visual object based on rendering the at least one new visual object utilizing same resources used to render the at least one previously rendered visual object;
   capture an image of the at least one new visual object rendered on the server-side computing device using the browser client; and
   integrate the image into a data file associated with the at least one previously rendered visual object.

10. The apparatus of claim 9, wherein the data file comprises a PDF document, wherein the data file is generated at the server-side computing device.

11. The apparatus of claim 9, wherein the server-side computing device comprises a web server.

12. The apparatus of claim 9, wherein the browser client comprises a headless browser client.

13. The apparatus of claim 9, wherein the at least one previously rendered visual object comprises at least one chart.

14. The apparatus of claim 9, wherein capturing an image of the at least one new visual object rendered on the server-side computing device comprises capturing a screenshot of the at least one new visual object.

15. The apparatus of claim 9, wherein the message data object is generated in response to a request for the data file at the client-side computing device.

16. A computer program product for visual object export, the computer program product comprising at least one non-transitory computer-readable storage medium, the at least one non-transitory computer-readable storage medium including instructions that when executed by at least one processor, cause the computer program product to:
   receive, by a server-side computing device, a message data object identifying at least one previously rendered visual object at a client-side computing device via a web application, wherein the message data object comprises at least configuration data that is used to control one or more parameters of the at least one previously rendered visual object, wherein the configuration data comprises of at least one of a visual object type, positional attributes, rendering styles, and data source identifiers of the at least one previously rendered visual object;
   render, at the server-side computing device utilizing a browser client, at least one new visual object corresponding to the at least one previously rendered visual object, based on the configuration data of the at least one previously rendered visual object, wherein the at least one new visual object is same as the at least one previously rendered visual object based on rendering the at least one new visual object utilizing same resources used to render the at least one previously rendered visual object;
   capture an image of the at least one new visual object rendered on the server-side computing device using the browser client; and
   integrate the image into a data file associated with the at least one previously rendered visual object.

* * * * *